United States Patent Office 3,299,061
Patented Jan. 17, 1967

3,299,061
PHOSPHONYLCHLOROMETHYL TRIAZINES AND THIODIAZOLES
Hansjuergen A. Schroeder, New Haven, Conn., assignor to Olin Mathieson Chemical Corporation, a corporation of Virginia
No Drawing. Filed July 15, 1964, Ser. No. 382,931
13 Claims. (Cl. 260—248)

This invention relates to substituted phosphonates, and more specifically it relates to phosphonylchloromethyl triazines and thiadiazoles having the following general formula:

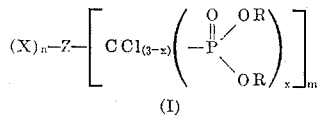

(I)

wherein Z represents a 1,3,5-triazine or a 1,2,4-thiadiazole nucleus, X is selected from the class consisting of hydrogen, lower alkyl, lower alkoxy and

$x$, $m$ and $n$ are integers from 1–2 and the sum of $m$ and $n$ is not more than 3, and wherein R is lower alkyl. As used in the specification and claims herein, the terms "lower alkyl" and "lower alkoxy" represent moieties having 1–4 carbon atoms.

It is known that trialkyl phosphites react with chlorine atoms and chloromethyl groups attached to a triazine nucleus to provide substituted phosphonates. Similarly, thiadiazoles having chlorine atoms and chloromethyl groups as ring substituents are known to react with trialkyl phosphites in a normal Michaelis-Arbuzov reaction to yield substituted phosphonates. For example, 3-chloromethyl-5-chloro-1,2,4-thiadiazole reacts with triethyl phosphite to provide a derivative with two phosphonyl moieties.

It is also known that trialkyl phosphites do not undergo the Arbuzov reaction with dichloromethyl groups attached to a triazine or thiadiazole nucleus. Similarly, trifluoromethyl groups attached to the same nuclei, for example 3-trifluoromethyl-5-chloro-1,2,4-thiadiazole, are unreactive to trialkyl phosphites.

Now however it has been found that trichloromethyl groups attached to a triazine or thiadiazole nucleus readily react with trialkyl phosphites to provide a series of hitherto unknown substituted phosphonates, specifically the phosphonylchloromethyl triazines and thiadiazoles having the Formula I. This is an unexpected and surprising feature of this invention considering the aforementioned unreactivity of the structurally similar $CHCl_2$ and $CF_3$ groups with trialkyl phosphites. The phosphonates (I) obtained as a result of the reactions disclosed herein are of high purity and are very stable, being particularly resistant to hydrolysis. They are useful as herbicides, and it has been found that they are particularly effective for controlling and destroying various species of unwanted vegetation.

Although a number of trialkyl phosphites may be used in the practice of this invention, it is preferred to employ the tri (lower alkyl) phosphites in the preparation of the phosphonates (I).

A variety of substituted triazines and thiadiazoles are employed in the reaction with the trialkyl phosphites to provide the derivatives (I). Thus, thiadiazoles having the formula

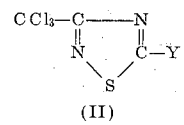

(II)

Y being hydrogen, a halogen atom, a lower alkyl group or a lower alkoxy group, may be utilized in the practice of this invention. These substituted thiadiazoles (II) are known compounds and are disclosed in, for example, J. Org. Chem., 27, 2589 (1962). When Y is a chlorine, bromine or iodine atom, the trialkyl phosphites also react with these atoms to provide phosphonylchloromethyl thiadiazole products having an additional phosphonyl group in the products (i.e., see Example 3 hereinafter).

Similarly, a number of substituted triazines may be used as starting materials in the preparation of derivatives having the Formula I. Triazines having the following formula may be used:

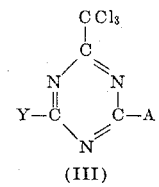

(III)

wherein A represents hydrogen, a halogen atom, a lower alkyl group, a lower alkoxy group or a trichloromethyl group; and wherein Y is as represented in (II) above. Compounds of this nature are disclosed in the literature as, for example, in J. Am. Chem. Soc., 81, 5658 (1959). Phosphonylchloromethyl triazines having additional phosphonyl substituents are again obtained when the starting chloromethylated triazine reactant also contains chlorine, bromine or iodine ring substituents.

The preparation of the derivatives (I) is conveniently performed by reacting the trialkyl phosphites with the substituted triazines and substituted thiadiazoles at a reaction temperature range of about 10° C. to about 180° C. Preferably a reaction temperature range of 20°–150° C. may be advantageously employed in the process of this invention.

As mentioned in the above discussion, certain halogen atoms attached to triazine or thiadiazole nuclei also react with trialkyl phosphites to provide phosphonyl substituted derivatives. In general these reactions appear to proceed at a faster reaction rate than the reaction of the phosphites with the trichloromethyl substituents, and thus when reactants of this nature are employed in the practice of this invention, a sufficient quantity of trialkyl phosphite must be employed in order to prepare the phosphonylchloromethyl derivatives (I). For instance, a molar amount of a substituted triazine (III) having two $CCl_3$ substituents as well as one of the aforementioned halogen substituents would require at least five moles of trialkyl phosphite if the reactions occurring are allowed to proceed to completion. Similarly, a molar amount of a thiadiazole (II) having one $CCl_3$ substituent and none of the aforementioned halogen substituents will react with two moles of a trialkyl phosphite wherein two of the chlorine atoms in the reactant are removed to provide a phosphonylmonochloromethyl thiadiazole.

During the preparation of the substituted phosphonates (I) alkyl halides are generated which may themselves react with trialkyl phosphite reactant to provide as a by-product the respective dialkyl alkylphosphonate. At the completion of the reaction period, these by-products are conveniently removed from the reaction mixture while the desired phosphonylchloromethyl derivatives are being isolated by, for example, distillation techniques.

The reactions described herein can also be advantageously carried out in the presence of an inert hydrocarbon solvent preferably those having 6–10 carbon atoms. For example, solvents of this nature which may be utilized in the practice of this invention include: hexane, heptane, octane, nonane, decane and isomers thereof, cyclohexane, benzene, toluene and various xylenes.

The derivatives (I) of this invention are valuable herbicides. They are effective in controlling the growth of various and obnoxious grasses, and in this respect they have shown activity when used in either pre-emergence or in post-emergence treatment. Thus in pre-emergence treatments, the derivatives (I) have been found to be very effective in controlling the growth of crab grass, rye grass, pigweed, and mustard growing in cotton, corn, and soybean crops. Similarly, they are effective in destroying the same weeds in the same crops when applied in the process of post-emergence treatment.

The following examples will serve to illustrate the preparation of the substituted phosphonates having the Formula I.

Example 1

A mixture of 10 g. of 2-trichloromethyl-4,6-diethoxy-s-triazine and 18 g. of triethylphosphite was heated with stirring at 90° C. A smooth exothermic reaction occurred and after subsiding the mixture was kept at 150° C. for 30 minutes. The O,O'-diethyl ethylphosphonate formed as by-product during the reaction was then removed from the reaction mixture by distillation at atmospheric pressure. The residue was distilled in vacuo to provide 11.0 g. of a water white liquid, B.P. 122° C./0.2 mm., $n_D^{30}$ 1.4705. The following analytical data revealed that the water white liquid was 2-diethylphosphonyldichloromethyl - 4,6-diethoxy-s-triazine. Yield: 81.5%.

*Analysis.*—Calcd. for $C_{12}H_{20}Cl_2N_3O_5P$: C, 37.13; H, 5.19; Cl, 18.27; N, 10.83; P, 7.98. Found: C, 37.98; H, 5.82; Cl, 17.27; N, 10.48; P, 8.14.

Example 2

An ice-cold mixture of 14 g. of 2,4-bis(trichloromethyl)-6-ethoxy-s-triazine and 55 g. of triethylphosphite was allowed to warm to 25° C. An exothermic reaction started suddenly and was controlled by ice-cooling. After it had subsided, the external bath was heated to 150° C. and kept at that temperature for 30 minutes. O,O'-Diethyl ethylphosphonate, formed during the reaction as a by-product, was stripped off, and the residue was distilled in vacuo to provide 18.0 g. of a water white liquid, B.P. 118° C./0.2 mm., $n_D^{31}$ 1.4436. The following analytical data revealed that this product was 2,4-bis(bis - diethylphosphonyl - monochloromethyl) - 6-ethoxy-s-triazine. Yield: 60%.

*Analysis.*—Calcd. for $C_{23}H_{45}Cl_2N_3O_{13}P_4$: C, 36.04; H, 5.92; Cl, 9.25; N, 5.48; P, 16.17. Found: C, 35.86; H, 6.58; Cl, 9.34; N, 4.22; P, 16.04.

Example 3

An amount of 18 g. of 3-trichloromethyl-5-chloro-1,2,4-thiadiazole was added dropwise with stirring to 15 g. of triethylphosphite maintaining the reaction mixture at 85° C. After the addition was complete, 7 g. of triethylphosphite was added in one batch and the dark red product was kept at 100° C. for 45 minutes. After stripping off the low boiling forerun, the high boiling residue was distilled twice in vacuo to give 6.9 g. of a water white liquid, B.P. 125° C./0.5 mm., $n_D^{27}$ 1.4750. The following analytical data revealed that this product was 3-diethylphosphonyldichloromethyl-1,2,4-thiadiazolyl(5)-diethyl-phosphonate. Yield: 20.6%.

*Analysis.*—Calcd. for $C_{11}H_{20}Cl_2N_2O_6P_2S$: C, 29.94; H, 4.57; Cl, 16.07; N, 6.35; P, 14.04. Found: C, 29.65; H, 4.83; Cl, 15.71; N, 5.97; P, 13.60.

What is claimed is:

1. Substituted phosphonates having the formula

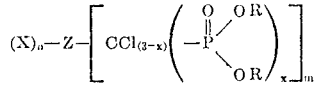

wherein Z is selected from the class consisting of a 1,3,5-triazine nucleus and a 1,2,4-thiadiazole nucleus, X is selected from the class consisting of hydrogen, lower alkyl, lower alkoxy and

x, m, and n are integers from 1–2 and the sum of m and n is not more than 3, and wherein R is lower alkyl.

2. Phosphonylchloromethyl thiadiazoles having the formula

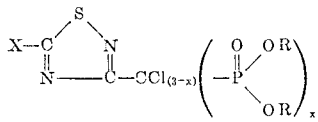

wherein X is selected from the class consisting of hydrogen, lower alkyl, lower alkoxy and

R is a lower alkyl group and x is an integer from 1–2.

3. The phosphonylchloromethyl thiadiazoles of claim 2 wherein X is a lower alkyl group.

4. The phosphonylchloromethyl thiadiazoles of claim 2 wherein X is a lower alkoxy group.

5. Phosphonylchloromethyl thiadiazoles having the formula

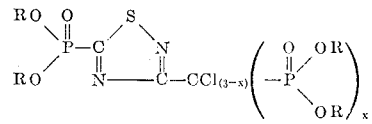

wherein R is a lower alkyl group and x is an integer from 1–2.

6. 3 - diethylphosphonyldichloromethyl - 1,2,4 - thiadiazolyl(5)-diethylphosphonate.

7. Phosphonylchloromethyl thiazines having the formula

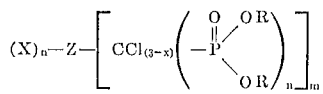

wherein Z is a 1,3,5-triazine nucleus, X is selected from the class consisting of hydrogen, lower alkyl, lower alkoxy and

x, m, and n are integers from 1–2 and the sum of m and n is not more than 3, and wherein R is lower alkyl.

8. Phosphonylchloromethyl triazines having the formula

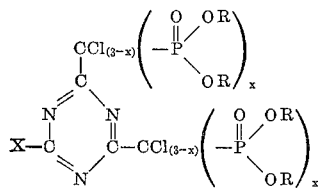

wherein X is selected from the class consisting of hydrogen, lower alkyl, lower alkoxy and

$x$ is an integer from 1-2, and R is lower alkyl.

9. The phosphonylchloromethyl triazines of claim 8 wherein X is lower alkoxy.

10. 2,4 - bis(bis - diethylphosphonyl - monochloromethyl)-6-ethoxy-s-triazine.

11. Phosphonylchloromethyl triazines having the formula

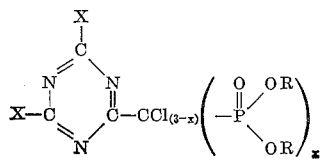

wherein X is selected from the class consisting of hydrogen, lower alkyl, lower alkoxy and

$x$ is an integer from 1-2, and R is lower alkyl.

12. The phosphonylchloromethyl triazines of claim 11 wherein X is lower alkoxy.

13. 2 - diethylphosphonyldichloromethyl - 4,6 - diethoxy-s-triazine.

References Cited by the Examiner

UNITED STATES PATENTS

| | | | |
|---|---|---|---|
| 2,631,162 | 3/1953 | Ladd et al. | 260—969 |
| 2,830,927 | 4/1958 | Sallmann | 260—969 |
| 2,831,014 | 4/1958 | Sallmann et al. | 260—969 |
| 3,105,001 | 9/1963 | Szabo et al. | 260—969 |

OTHER REFERENCES

Kamai et al.: Proc. Acad. Sci. U.S.S.R., Sect. Chem. (Eng. Trans) vol 109 (1956), p. 337. Copy in 260-969.

ALEX MAZEL, *Primary Examiner.*

R. J. GALLAGHER, *Assistant Examiner.*